United States Patent [19]

Yale

[11] Patent Number: 5,587,903
[45] Date of Patent: Dec. 24, 1996

[54] ARTIFICIAL INTELLIGENCE LANGUAGE PROGRAM

[76] Inventor: Thomas W. Yale, c/o Yale Laboratories, Inc. 9, White Oak Rd., Springfield, Ill. 62707

[21] Appl. No.: 264,071

[22] Filed: Jun. 22, 1994

[51] Int. Cl.$^6$ .............................. G06F 17/27; G06F 17/00
[52] U.S. Cl. .............................. 395/759; 395/54; 395/55; 395/60; 395/63; 395/67
[58] Field of Search .......................... 364/419.01, 419.02, 364/419.04, 419.08; 395/12, 54, 55, 60, 63, 67

[56] References Cited

U.S. PATENT DOCUMENTS

| | | |
|---|---|---|
| 4,730,270 | 3/1988 | Okajima et al. . |
| 4,779,208 | 10/1988 | Tsuruta et al. .............................. 395/67 |
| 4,864,503 | 9/1989 | Tolin . |
| 4,887,212 | 12/1989 | Zamora et al. . |
| 4,912,648 | 3/1990 | Tyler .......................................... 395/61 |
| 5,251,129 | 10/1993 | Jacobs et al. . |

FOREIGN PATENT DOCUMENTS

WO86/00445  1/1986  WIPO .

OTHER PUBLICATIONS

"Modeling Semantic Constraints with Logic in the Earl Data Model"; *Data Engineering, 1989 5th International Conference;* 1989; pp. 226–233.

King et al.; "In Plain English, Please; Communicating with Computers Using Natural Language Processing"; *Journal of Accountancy;* 169, n3; p. 43(5); Mar. 1990; Dialog: File 148, Acc#04638990.

Dialog Abstract: File 2, Acc#03748276; Yamauchi et al.; "Loose Coupling of Kaus with Existing RDBMSs"; *Data & Knowledge Engineering;* v5, n3; pp. 227–251; Sep. 1990.

*Primary Examiner*—Donald E. McElheny, Jr.
*Assistant Examiner*—Stephen R. Tkacs
*Attorney, Agent, or Firm*—Richard C. Litman

[57] ABSTRACT

A sentence entered by a user is translated into Esperanto. The translated sentence is then parsed and a series of propositions are generated. Each proposition consist of a subject, verb, and an optional object such as an adjective, noun, or prepositional phrase, if present. A series of propositional databases are used to relate the various propositions as to their function within the sentence, thereby mapping the thought of the sentence in a form recognizable by a machine.

14 Claims, 3 Drawing Sheets

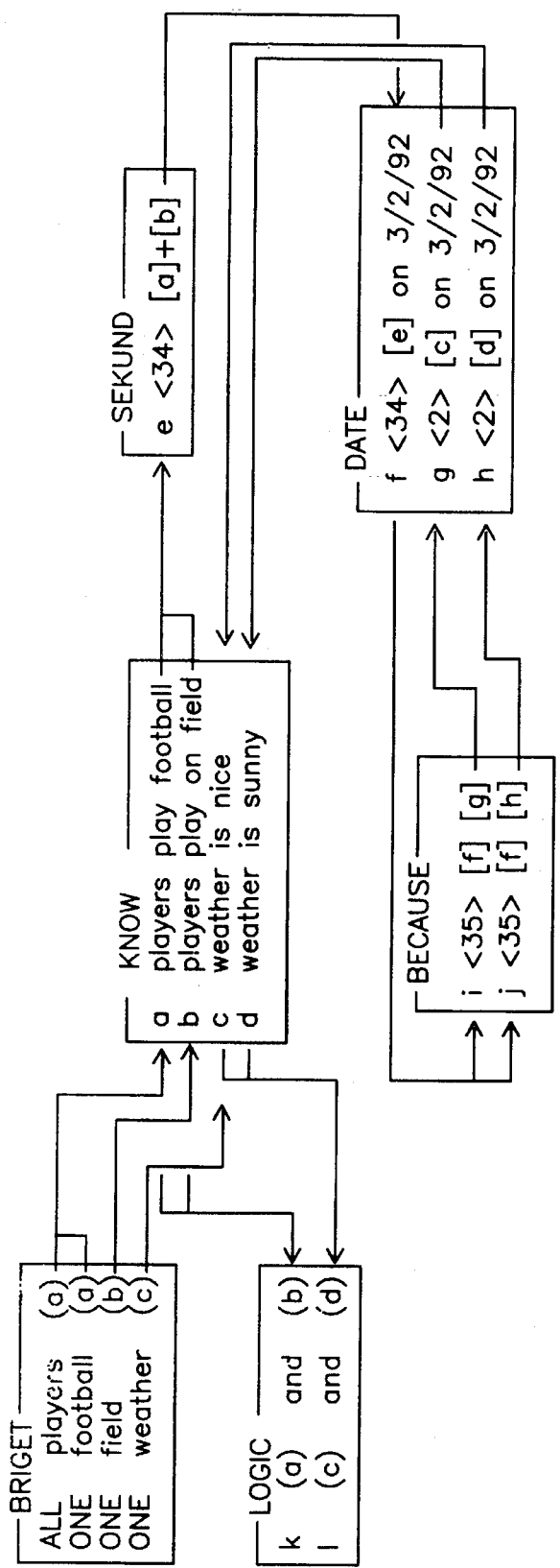
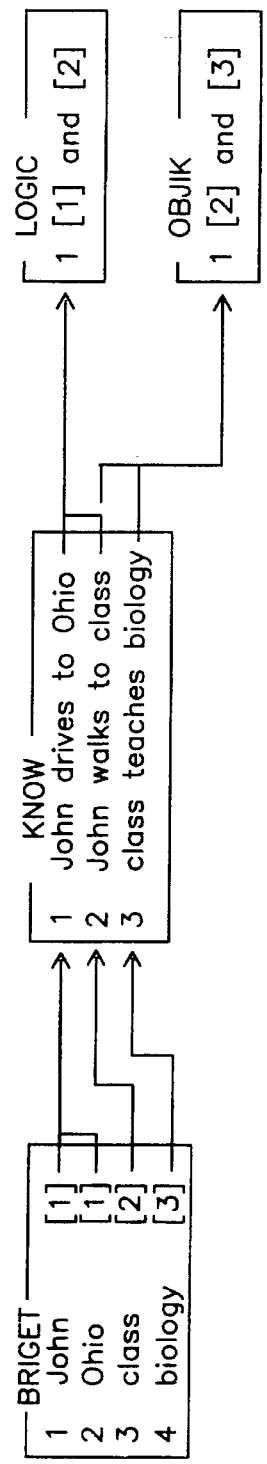
FIG. 2
FIG. 1

ARTIFICIAL INTELLIGENCE LANGUAGE PROGRAM

BACKGROUND OF THE INVENTION

1. Field of the Invention

The present invention relates to a system for allowing a computer to interface with a user in the natural language of the user. Data may be compiled and evaluated from the text supplied by the user. Each time the user supplies more information, the relevant data bases are updated and any modifications to the current data based on the new data or any resolution of conflicts between the current data and the new data within the relevant data bases are made by the system interacting with the user in his or her natural language. The present system therefor deals with an interactive data base program which endeavors to provide the user with the most friendly system available for compiling data for the purposes of rendering conclusions through user interaction with ultimate goal of arriving at the desired solution to the problem the user is attempting to solve.

2. Description of the Prior Art

U.S. Pat. No. 4,730,270 issued Mar. 8, 1989 to Atsushi Okajima et al. discloses a system for translating a first language into a second language. The system allows for user interaction during the translation process.

U.S. Pat. No. 4,864,503 issued Sep. 5, 1989 to Bruce G. Tollin discloses a method of using a created international language, namely Esperanto, as an intermediate pathway in translating a communication in a first language to one of a plurality of target languages. The communication is initially translated into Esperanto, afterwhich, the Esperanto translation of the communication is then translated into a target language.

U.S. Pat. No. 4,887,212 issued Dec. 12, 1989 to Antonio Zamora et al. discloses a parser for natural language text which provides syntactic analysis of text. The syntactic analysis is made word for word in their sequence of occurrence. Zamora makes use of a dictionary look-up table combined with a complement grammar analysis.

U.S. Pat. No. 5,251,129 issued Oct. 5, 1993 to Paul S. Jacobs et al. discloses a word-by-word morphological analysis system and method. The method used in Jacobs et al. divides a word up into its component root(s), prefix(es), and suffix(es). All derived entries are returned from a lexicon so as to determine all applicable semantic transformation rules so that a complete morphological analysis may be made.

None of the above inventions and patents, taken either singly or in combination, is seen to describe the instant invention as claimed.

SUMMARY OF THE INVENTION

The present invention provides an interactive database program allowing a user to interact therewith in his or her native language. In the preferred embodiment the native language used by the user is assumed to be English, and the preferred form of communication is type written text from a keyboard. In this manner the user inputs data into the computer via a keyboard by simply typing in English the information he or she wishes to inquire from or deliver to the computer, making the computer very user friendly.

Once text is received from the user, the system of the present invention translates the text to Esperanto. The system first resolves any possible syntactic ambiguity by analyzing each word within the text from left to right so as to determine which words are "identifiers" and which are not. "Identifiers" are defined as articles, conjunctions, prepositions, pronouns, and words in general which have a single application in a sentence and are unlikely to be misconstrued as having any other application within the sentence. "Non-identifiers" include words like "nurses" which could be a subject or a verb and "clean" which could be an adjective or a verb, depending upon the context in which they are used within a sentence. The formation of the whole sentence is identified to resolve the most likely part of speech each word within a sentence should have.

Following translation, a user's sentence in Esperanto is broken down into a series of propositions. All propositions consist of a subject, verb, and an optional object such as an adjective, noun, or prepositional phrase, if present. For example, "the quick brown fox jumps over the lazy dog" consists of the propositions "fox jumps over dog", "fox is quick", "fox is brown", and "dog is lazy."

These derived propositions are then integrated and managed within a database structure. There is a knowledge database listing having all of the propositions located therein. A Briget database listing includes nouns and a logic database listing includes linkages between the various propositions. Another set of database listings called peripheral databases reflect the information of certain instances of an event with regard to date, time, number, place, manner, and condition, if applicable.

A TERTIAR database is used to store tertiary linkages between different proposition records in the knowledge (KNOW) database. A SEKUND database is used to store secondary linkages between different propositions. An S-NUM database is used to store a number of a plural subject noun used in a proposition of the knowledge database. An O-NUM database is used to store a number of a plural object noun in the KNOW database. An ADVERB database is used to store the manner in which an event described in the knowledge database occurs. A DATE database is used to store dates regarding the manner in which an event described in KNOW occurs. An IF data-base is used to store linkages in which occurrences described in a KNOW proposition depends on a condition being true.

Accordingly, it is a principal object of the invention to translate a sentence entered by a user into an universal language, such as Esperanto.

It is another object of the invention to parse the sentence, resolving any pronoun ambiguities.

It is a further object of the invention to use the parsed sentence to generate a plurality of propositions, for example including a subject, noun, and object, and to store these propositions in a knowledge database.

Still another object of the invention is to use peripheral databases to relate the various propositions within the knowledge database in various manners illustrating the various relationships of thought contained therein, such as cause and effect.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 illustrates the use of propositional and peripheral databases for a first example.

FIG. 2 illustrates the use of propositional and peripheral databases for a second example.

Similar reference characters denote corresponding features consistently throughout the attached drawings.

DETAILED DESCRIPTION OF THE PREFERRED EMBODIMENT

Figure 3:
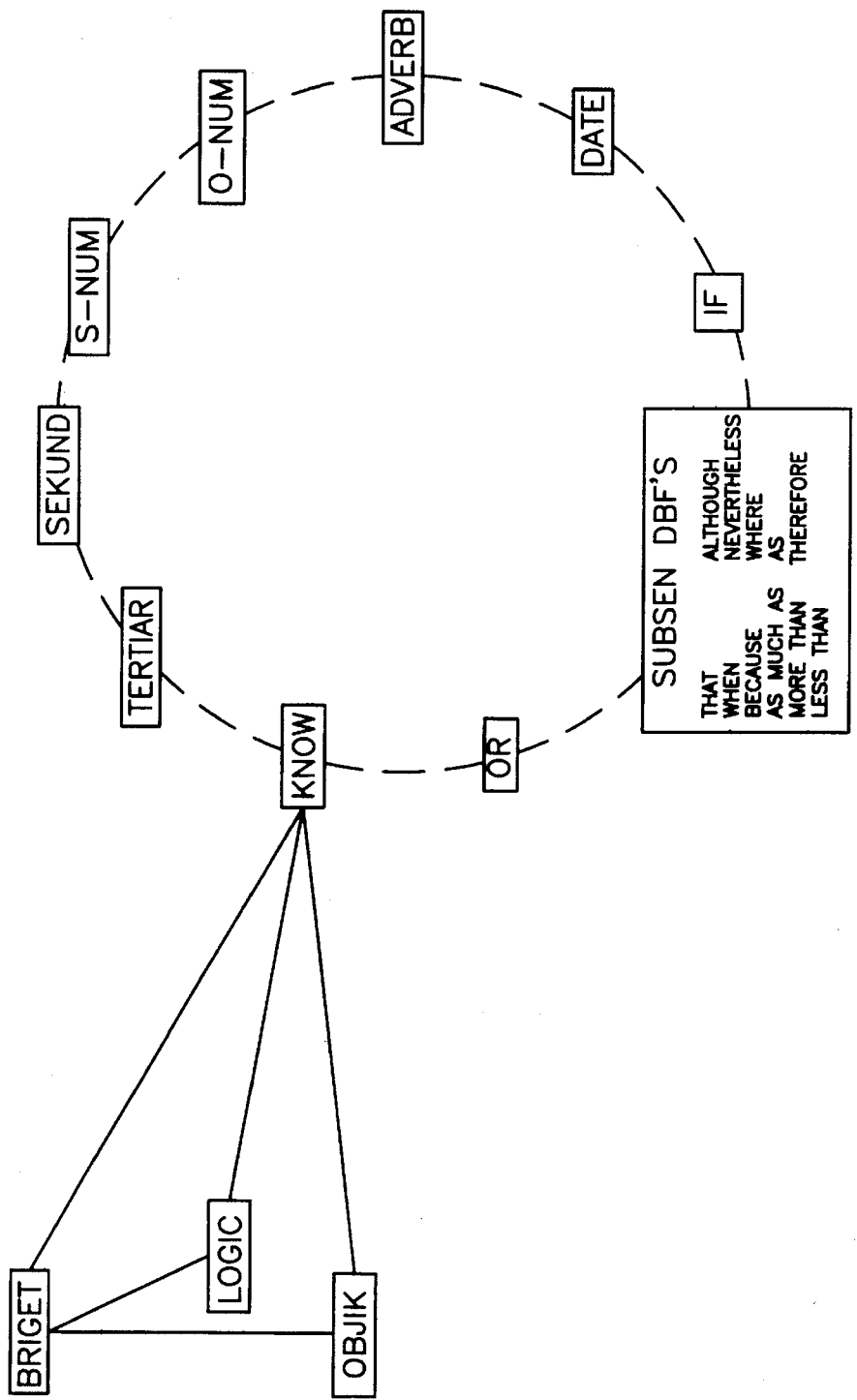
FIG. 3 illustrates all of the possible linkages between the various propositional all peripheral databases.

The present invention allows a user to interface with a computer in the natural language of the user. Data is compiled and evaluated from text supplied by the user. Each time the user supplies more information, the relevant databases are updated. Any modifications to the current data based on the new data or any resolution of conflicts between the current data and the new data within the relevant databases are made by the system interacting with the user in his or her natural language. The present user-friendly system provides an interactive database program which compiles data for the purposes of rendering conclusions through user interaction with the ultimate goal of arriving at the desired solution to a problem the user is attempting to solve.

In the preferred embodiment, the native language of the user is assumed to be English, and the preferred form of communication is type-written text from a computer keyboard. In this manner, the user inputs data into the computer via a keyboard by simply typing in English the information he or she wishes to inquire about.

I. English/Esperanto Machine Translation Process.

Once the user enters a sentence, the system of the present invention translates the entire sentence to Esperanto. A literal translation subroutine is used in conjunction with a context-dependent grammar subroutine to resolve any syntactic and semantic ambiguities.

A) Syntactic Ambiguities.

Each word of the sentence entered by the user is analyzed from left to right to determine which words are identifiers and which are non-identifiers. Identifiers are words such as articles, conjunctions, prepositions, pronouns and words which are unlikely to be misconstrued to have any other application in a sentence. Those words in the sentence which are non-identifiers, having more than one possible part of speech within the context of the sentence, are identified along with the possible parts of speech they may have within the sentence. Identifiers on either side of each set of non-identifiers are used to determined the most like parts of speech for the non-identifiers. For example, a sentenced entered by the user might be—"The nurses keep clean sheets and blankets in the closet." In this instance, Arr1={"the", "and", "in", "the"}

Pos1={"R", "C", "P", "R"}, where Arr1 is an array identifying the set of identifiers within the sentence and Pos1 identifying those parts of speech for the set of identifiers where "R" represents an article, "C" represents a conjunction, and "P" represents a preposition. The set of non-identifiers and the possible parts of speech of each non-identifier between the identifiers are listed in the arrays Arr2 and Pos2, respectively, as listed below:

Arr2={{}, {"nurses", "keep", "clean", "sheets"}, {"blankets"}, {"closet"}, and

Pos2={{}, {"SV", "V", "AV", "S"}, {"SV"}, {"S"}.

In this example "nurses" may be a plural substantive or third-person singular verb, "SV", and "clean" is either an adjective or verb "AV." The programming of the present invention looks at the possible patterns and determines the most likely pattern possible For example, "blankets" and "sheets" are separated by a conjunction "and." Therefore, since "sheets" is a noun, then it is most likely that "blankets" is also a noun instead of a verb. Further, since two consecutive verbs not separated by a conjunction is most unlikely, then Pos2 is determined to be {{}, {"S", "V", "A", "S"}, {"S"}, {"S"}.

In certain conditions, resolving such ambiguities in sets less than three words is not as simple. Where such conditions arise, the control program still uses a table identifying the most likely pattern for the parts of speech of the sentence to determine what parts of speech the non-identifiers most likely are.

B) Inflection Codes.

The translator identifies the parts of speech of a word by its inflection codes as listed in the English vocabulary database. Corresponding codes in the Esperanto vocabulary database are not necessary since they are always regular. There are three types of inflection codes; part of speech (POS) inflection, regular inflection, and syntactic inflection.

POS inflection involves codes to convert a word from its nominal part of speech to other parts of speech. For example the word "analyze" has the following parts of speech:

"analyze", "analysis", "analytical", "analytically".

The translation of these forms to Esperanto is completely regular. The Esperanto translation of an English word which appears in its nominal POS in the vocabulary database therefor, only requires the modification of the last letter which identifies its POS. Therefore, the translation of the various POS for "analyze" is as follows:

"(to) analyze"—"analiz-i" "analytical"—"analiz-a"

"analysis"—"analiz-o" "analytically"—"analiz-e"

Regular inflection involves the codes to pluralize nouns, conjugate verbs, and form comparatives and superlatives of adjectives and adverbs:

| VERB | NOUN |
| --- | --- |
| "analyzes" — "analiz-as" <br> "analyzed" — "analiz-is" <br> "analyzed" — "analiz-ata" <br> "analyzing" — "analiz-anta" | "analyses" — "analiz-oj" |

| ADJ | ADV |
| --- | --- |
| "more analytical" — <br> "pli analaz-a" <br> "most analytical" — <br> "plej analiz-e" | "more analytically" — <br> "pli analiz-e" <br> "most analytically" — <br> "plej analiz-e" |

The inflection code rules used by the translator allow for the recognition of words not explicitly listed in either the Esperanto or English vocabulary databases. For example, one rule directs the translator to recognize any verb ending with "-ct" as forming an "agent" noun by adding "-or." For example:

| VERB | AGENT |
| --- | --- |
| "direct" — "direkt-i" | "director" — "direkt-anto" |
| "act" — "akt-i" | "actor" — "akt-anto" |
| "conduct" — "konduct-i" | "conductor" — "konduct-anto" |

Also, any verb ending with "-ze" forms the noun to describe "one professionally associated with" the activity to which the verb relates by dropping the "-ze" and adding "-yst". For example,

| VERB | AGENT |
|---|---|
| "analyze" — "analiz-i" | "analyst" — "analiz-isto" |
| "catalyze" — "kataliz-i" | "catalyst" — "kataliz-isto" |

C) Semantic Ambiguity.

The translator, after having parsed the sentence, determines whether the given words of a particular part of speech have different meanings. From the previous example, "keep" can mean either "to store", "to retain", or "to remain." The means by which the translator attempts to resolve this ambiguity is called semantic categorization. Words in both the English and Esperanto vocabulary databases are semantically categorized. For example, the word "keep" has three unambiguous Esperanto translations, 1) "stori" (to store) Applicative—Supply—Object-Centered
2) "reteni" (to retain) Retentive—Object-Centered
3) "resti" (to remain) Passive Action—Subject-Centered.

Verbs which fall in the first category, "to store", could have an object noun follow thereafter. In the example presented above, the object nouns which follow "keep" are "sheets" and "blankets." In a single proposition, verbs which fall in the third category of "keep" can only have adjectives or prepositional phrases follow.

For example "to remain/keep quiet" or "remain/keep at home." In this manner, the translator attempts to eliminate all such possibilities according to rules based on semantic categorization. It will then search for propositions in the knowledge base, interposing any semantically ambiguous verb to determine the specific meaning. As a last resort, if the system cannot narrow down one sense of the word "keep" based on propositions of a previously entered sentence, it will prompt the user to clarify which sense of "keep" is meant, "to store" or to "remain."

D) Transformational Grammar Rules.

Although word order in Esperanto and English are similar, they are not always the same for every sentence; therefore, word for word translation between the two languages is not always possible. It is sometimes necessary to rearrange the sentence structure without changing the meaning before a proper translation is possible between one language to the other. For example, "Did John answer the question correctly?", is changed to: "Whether John answered question correctly?", translated to: "Cĉu Johano respondis demandon korekte?"

II. Knowledge Representation Using Database Linkages.

Following the translation of a user's sentence, the sentence is broken down into a series of propositions. All propositions consist of a subject, verb, and an optional object. The optional object may be an adjective, noun, or prepositional phrase. For example, the sentence "The quick brown fox jumps over the lazy dog" includes the propositions "fox jumps over dog", "fox is quick", "fox is brown", and "dog is lazy." Propositions are stored in a knowledge (KNOW) database file.

A) Relational Databases.

The knowledge of events or statements represented by the derived propositions and stored within the KNOW database are integrated and managed within a relational database structure. As illustrated in FIG. 1, a BRIGET database is used to list any "separate occurrence" of all nouns used in KNOW. A rules database LOGIC is used to link subsequent propositions involving entities previously discussed. All links for noun subjects first occurring as objects are stored in a rule base OBJIK.

In the example illustrated in FIG. 1, the first proposition entered into the KNOW database is "John drives to Ohio", the second proposition is "John walks to class", and the third proposition is "class teaches biology." The subject "John" first occurs in KNOW in the first proposition [1] as indicated in BRIGET. Also indicated in BRIGET is the first occurrence of "Ohio" as the second listing thereof which occurs in the first proposition, the first occurrence of "class" as the third listing thereof which occurs in the second proposition, and the first occurrence of "biology" as the fourth listing thereof which occurs in the third proposition. The first rule in LOGIC indicates that the first and second propositions have common subjects, while the first rule in OBJIK indicates that proposition three has a noun subject which first appeared as an object in proposition two.

B) Peripheral Databases and Subsentence Database Linkages.

Another network of peripheral databases, linked to the knowledge and rule databases, reflect the information on certain instances of an event with regard to place, date, time, number, manner and/or condition. In the example as illustrated in FIG. 3, there are two peripheral databases used: SEKUND containing the secondary propositional links, and DATE. Note that records in BRIGET are of three kinds: those specifying individual nouns (e.g., "John"), nouns in partial groups (e.g., "some, not all Johns"), or nouns in a universal sense (e.g., "no Johns", "all Johns", "any John").

The sentence used in the example of FIG. 3 is "All players will play football on the field on Mar. 2, 1992 because the weather will be nice and sunny then (on Mar. 2, 1992)." There are six peripheral databases used by the present invention. They are SEKUND, S-NUM, O-NUM, ADVERB, DATE, and IF having the following definitions and supplementary definitions:

TRANSLATION—converting text entered by the user to Esperanto by analyzing from left to right each word of text to determine which words are identifiers and which are non-identifiers, IDENTIFIERS—the text which are articles, conjunctions, prepositions, pronouns, and words unlikely to be misconstrued to have any other application in a sentence, NON-IDENTIFIERS—the text in a sentence having more than one possible part of speech within the context of the sentence, PROPOSITIONS—following translation, a user's sentence in Esperanto is broken down into a series of propositions; all propositions consist of a subject, verb, and an optional object such as an adjective, noun, or prepositional phrase, LINKS/LINKAGES—entries including information defining the locations in other databases the identical entry also appears, KNOW—to store propositions relating to events or circumstances, BRIGET—to store a list of all nouns used in KNOW occurring only once, LOGIC—to store subsequent propositions involving entities previously occurring through a set of rules, OBJIK—to store all linkages first occurring as objects through a set of rules, TERTIAR—to store tertiary linkages between different proposition records in KNOW, SEKUND—to store secondary linkages between different propositions records in KNOW, S-NUM—to store a number of a plural subject noun in a KNOW record, O-NUM—to store a number of a plural object noun in a KNOW record, ADVERB—to store adverbs regarding the manner in which an event is described in KNOW occurs, DATE—to store dates regarding what date an event occurs, and IF—to store linkages in which occurrence described in a KNOW proposition depends on a condition being true, SUBSEN (subsentence databases)—to store linkages between events by use of conjuctions such as "because", "after", "before", "therefore", "although", "nevertheless", and "that,"

OR—to store linkages in any of the above mentioned databases connected by an alternative.

FIG. 3 illustrates all of the databases used in the present invention as discussed above. Each of the entries of the various peripheral databases includes linkage information defining the locations in the other databases that entry also appears. For example, as illustrated in FIG. 2, those databases having single entries per line include a digital weight being assigned to each peripheral database, as illustrated below:

| SEKUND | S-NUM | O-NUM | ADVERB | DATE | IF |
| --- | --- | --- | --- | --- | --- |
| 32 | 16 | 8 | 4 | 2 | 1 |

Therefore, the entry (e) in SEKUND appears in SEKUND and DATE. SEKUND is weighted 32 and DATE is weighted 2, therefore the linkage data for entry (e) is 34. In the BECAUSE subsentence database relating cause entry (f) to condition entry (g) the linkage data represents two peripheral database locations, the first being the location of the entry (f) and the second being the location of the entry (g). This is done by taking the modulus operation of the number with respect to the possible number of databases used to obtain the location of the first entry and taking the integer operation of the number of databases used to obtain the second entry. In FIG. 2, the first entry (i) in the BECAUSE database relates entries (f) and (g), both found in the DATE database. Therefore the linkage data 35 represents 35 Mod(6)=Mod(35/6)=5, which represents the fifth peripheral database which is DATE as the location of the entry (f). The location of the (g) entries is the same database as represented by 35 Int(6)=Int(35/6)=5.

Figure 4:
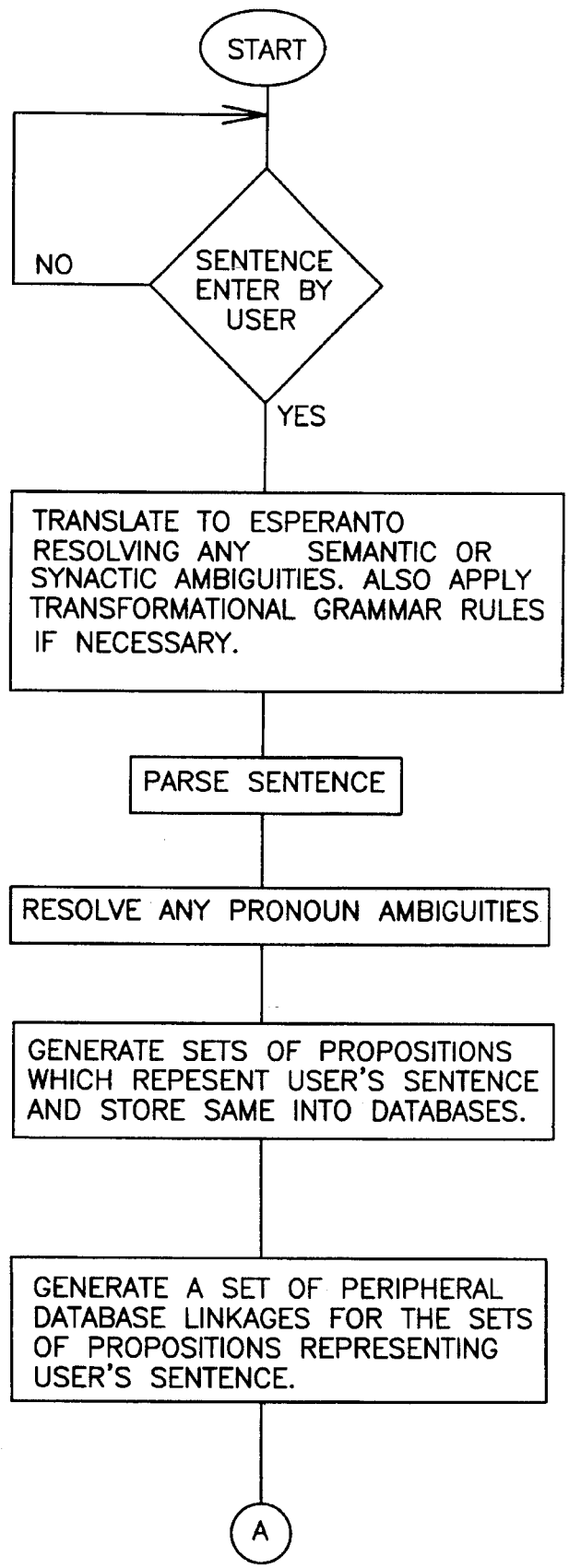
FIG. 4 is a flow chart of the several steps of the present invention.

FIG. 4 illustrates the basic steps of operation for the present invention. As illustrated, once a sentence is entered, the sentence is translated into Esperanto resolving any semantic or syntactic ambiguities as discussed above. Also transformational grammar rules are applied to the English sentence if necessary to provide the same sentence form used in Esperanto. Afterwards, the translated sentence is parsed as disclosed above and any pronoun ambiguities are resolved. The KNOW database is generated as discussed above after the translation process is completed. Each proposition is then related within any relevant propositional databases so as to represent the user's sentence into a thought pattern which can be recognized as an English sentence.

It is to be understood that the present invention is not limited to the sole embodiment described above, but encompasses any and all embodiments within the scope of the following claims.

I claim:

1. A method for translating a sentence entered by a user into machine recognizable thought patterns, said method comprising:

receiving the sentence entered by the user;

translating the user's sentence to a universal language;

parsing the translated sentence;

deriving propositions from the parsed translated sentence of the user;

sequentially storing the derived propositions into a knowledge database; and, generating a set of peripheral database linkages for the sets of derived propositions representing the user's sentence, wherein each peripheral database linkage includes a peripheral database representing a function of speech selectively linked to one or more of the other peripheral databases and the knowledge database.

2. A method as claimed in claim 1, wherein said step of translating includes the steps of resolving any semantic and syntactic ambiguities.

3. A method as claimed in claim 2, further comprising the step of resolving any pronoun ambiguities after said step of parsing the translated sentence.

4. A method as claimed in claim 1, further comprising the steps of storing each noun present in each derived proposition into a noun database listing in conjunction with the identification of the proposition the noun first appears respective to the sequential order of the propositions stored in the knowledge database.

5. A method as claimed in claim 1, further comprising the steps of storing in a logic database the identification of a pair of propositions stored in the knowledge database having a common subject noun.

6. A method as claimed in claim 1, further comprising the steps of storing in an object database the identification of a pair of propositions, wherein a first proposition of the pair of propositions includes an object noun used as a subject noun in a second proposition of the pair of propositions.

7. A method as claimed in claim 1, wherein said step of generating a set of peripheral database linkages include the steps of:

storing in a first number database all database linkages having the same subject, wherein the subject is a number;

storing in a second number database all database linkages having the same object, wherein the object is a number;

storing in an adverb database adverbs found in the knowledge database; and, storing in a date database any dates found in the knowledge database;

wherein each listing within any of the peripheral databases includes linking data identifying each database that listing can be found.

8. A system for translating a sentence entered by a user into machine recognizable thought patterns, said method comprising:

means for receiving the sentence entered by the user;

means for translating the user's sentence to a universal language;

means for parsing the translated sentence;

means for deriving propositions from the parsed translated sentence of the user;

means for sequentially storing the derived propositions into a knowledge database; and, means for generating a set of peripheral database linkages for said sets of derived propositions representing the user's sentence, wherein each of said peripheral database linkages include a peripheral database representing a function of speech selectively linked to one or more of the other peripheral databases and the knowledge database.

9. A system as claimed in claim 8, wherein said translation means includes the means for resolving any semantic and syntactic ambiguities.

10. A system as claimed in claim 8, further includes means for resolving any pronoun ambiguities.

11. A system as claimed in claim 8, means for storing each noun present in each derived proposition into a noun database listing in conjunction with the identification of the proposition the noun first appears respective to the sequential order of the propositions stored in the knowledge database.

12. A system as claimed in claim 8, further comprising means for storing in a logic database the identification of a pair of propositions stored in the knowledge database having a common subject noun.

13. A system as claimed in claim 8, further comprising means for storing in an object database the identification of a pair of propositions, wherein a first proposition of the pair of propositions includes an object noun used as a subject noun in a second proposition of the pair of propositions.

14. A system as claimed in claim 8, wherein generating means further includes:

means for storing in a first number database all database linkages having the same subject, wherein the subject is a number;

means for storing in a second number database all database linkages having the same object, wherein the object is a number;

means for storing in an adverb database adverbs found in the knowledge database; and, means for storing in a date database any dates found in the knowledge database;

wherein each listing within any of said peripheral databases includes linking data identifying each database that listing can be found.

\* \* \* \* \*